US012555952B2

(12) United States Patent
Tokumoto et al.

(10) Patent No.: US 12,555,952 B2
(45) Date of Patent: Feb. 17, 2026

(54) CPA-ATTACHED CONNECTOR AND WIRE HARNESS

(71) Applicants: Yazaki Corporation, Tokyo (JP); MAZDA MOTOR CORPORATION, Hiroshima (JP)

(72) Inventors: Koki Tokumoto, Makinohara (JP); Yusuke Tsutagawa, Makinohara (JP); Yasuhiro Otsuta, Makinohara (JP); Yasuhiro Tanaka, Makinohara (JP); Yoshio Nakamura, Hiroshima (JP); Yo Yamada, Hiroshima (JP)

(73) Assignees: YAZAKI CORPORATION, Tokyo (JP); MAZDA MOTOR CORPORATION, Hiroshima (JP)

( * ) Notice: Subject to any disclaimer, the term of this patent is extended or adjusted under 35 U.S.C. 154(b) by 343 days.

(21) Appl. No.: 18/485,567

(22) Filed: Oct. 12, 2023

(65) Prior Publication Data

US 2024/0128683 A1 Apr. 18, 2024

(30) Foreign Application Priority Data

Oct. 14, 2022 (JP) ................................ 2022-165680

(51) Int. Cl.
*H01R 13/627* (2006.01)
*H01R 13/641* (2006.01)

(52) U.S. Cl.
CPC ....... *H01R 13/6272* (2013.01); *H01R 13/641* (2013.01)

(58) Field of Classification Search
CPC H01R 13/6272; H01R 13/641; H01R 13/639; H01R 13/502
See application file for complete search history.

(56) References Cited

U.S. PATENT DOCUMENTS

| | | | | |
|---|---|---|---|---|
| 2006/0089031 A1* | 4/2006 | Flowers | ............. | H01R 13/5812 439/157 |
| 2017/0170602 A1* | 6/2017 | Matsumoto | .......... | H01R 13/057 |
| 2019/0312373 A1* | 10/2019 | Nakamura | ......... | H01R 13/4364 |
| 2020/0136311 A1* | 4/2020 | Narama | ............... | H01R 13/639 |
| 2020/0395706 A1* | 12/2020 | Ishikawa | ............ | H01R 13/4364 |
| 2024/0128683 A1* | 4/2024 | Tokumoto | ............ | H01R 13/641 |

FOREIGN PATENT DOCUMENTS

| | | | |
|---|---|---|---|
| EP | 2993740 A1 * | 3/2016 | ........... H01R 13/641 |
| JP | 2009-301775 A | 12/2009 | |

* cited by examiner

*Primary Examiner* — Abdullah A Riyami
*Assistant Examiner* — Nader J Alhawamdeh
(74) *Attorney, Agent, or Firm* — Sughrue Mion, PLLC

(57) ABSTRACT

The CPA-attached connector 1*a* includes a connector body 11 and a CPA member 12. The connector body 11 includes a temporary latch portion 112 for the CPA member 12, a full latch portion 113 which, before the mating with a mating connector, restricts full latch of the CPA member, and which, during the mating, cancels restriction of the full latch by the mating connector, and a hood portion 114 configured to cover, in a manner of a canopy, a portion of the CPA member 12 in the full latch state. The CPA member 12 includes a CPA body 121 and a finger rest portion 122 provided on the CPA body 121, a portion of the finger rest portion 122 being exposed from the hood portion 114 even in the full latch state, an inclined surface 122*a* being formed in the exposed portion to incline toward a central axis of the connector body 11 in accordance with a distance from the hood portion 114.

12 Claims, 7 Drawing Sheets

CPA-ATTACHED CONNECTOR AND WIRE HARNESS

TECHNICAL FIELD

The present invention relates to a CPA-attached connector and a wire harness provided with a CPA member for assuring mating with a mating connector.

BACKGROUND

Conventionally, a CPA-attached connector provided with a CPA member for assuring mating with a mating connector is known (for example, see Patent Document 1). In the CPA-attached connector according to Patent Document 1, the CPA member, which is held on a connector body in a temporary latch state before mating with a mating connector, assures mating by making a full latch during mating.

RELATED ART

Patent Document

[Patent Document 1] JP 2009-301775 A

SUMMARY OF THE INVENTION

Problem to be Solved by the Invention

Here, in the above-described CPA-attached connector, the CPA member also has a function of prohibiting mating cancellation of the connector body from the mating connector. During mating cancellation, first, the CPA member is returned from the full latch state to the temporary latch state, so that the mating cancellation is permitted, and thereafter the mating cancellation is performed. In this case, the CPA member in the full latch state may often be touched with a hand. However, it is not desirable that the CPA member is returned to the temporary latch state due to such an unexpected contact, and that the connector body is unintentionally released from the mating connector.

Accordingly, in view of the above problems, it is an object of the present invention to provide a CPA-attached connector and a wire harness capable of alleviating unintentional returning of the CPA member from the full latch state to the temporary latch state.

Solution to Problem

In order to solve the above problems, a CPA-attached connector includes a connector body including a peripheral wall in a tubular shape and configured to mate with a mating connector; and a CPA member attached to the connector body in a temporary latch state, and configured to, during mating between the connector body and the mating connector, assure the mating by making a full latch and prohibit mating cancellation, and configured to, before the mating cancellation, return to the temporary latch state to permit the mating cancellation, wherein the connector body includes: a temporary latch portion which is provided on the peripheral wall and to which the CPA member is attached in the temporary latch state; a full latch portion provided on the peripheral wall, the full latch portion being a portion to which, during the mating, the CPA member makes the full latch, and which, before the mating, restricts the full latch of the CPA member, and which, during the mating, cancels restriction of the full latch by the mating connector; and a hood portion provided on the peripheral wall to cover, in a manner of a canopy, a portion of the CPA member in the full latch state, and wherein the CPA member includes: a CPA body configured to make the temporary latch to the temporary latch portion and make the full latch to the full latch portion; and a finger rest portion which is a portion provided on the CPA body so as to be exposed from the hood portion in the temporary latch state and serving as a finger rest during transition to the full latch state, a portion of the finger rest portion being exposed from the hood portion even in the full latch state, an inclined surface being formed in the exposed portion to incline toward a central axis of the connector body in accordance with a distance from the hood portion.

Furthermore, in order to solve the above problems, a wire harness includes the above-described CPA-attached connector and an electric wire extending from the connector body.

Advantageous Effects of the Invention

According to the above-described CPA-attached connector and the wire harness, unintentional returning of the CPA member from the full latch state to the temporary latch state can be alleviated.

DETAILED DESCRIPTION OF THE EXEMPLARY EMBODIMENT

Hereinafter, one embodiment of a CPA-attached connector and a wire harness is explained.

Figure 1:
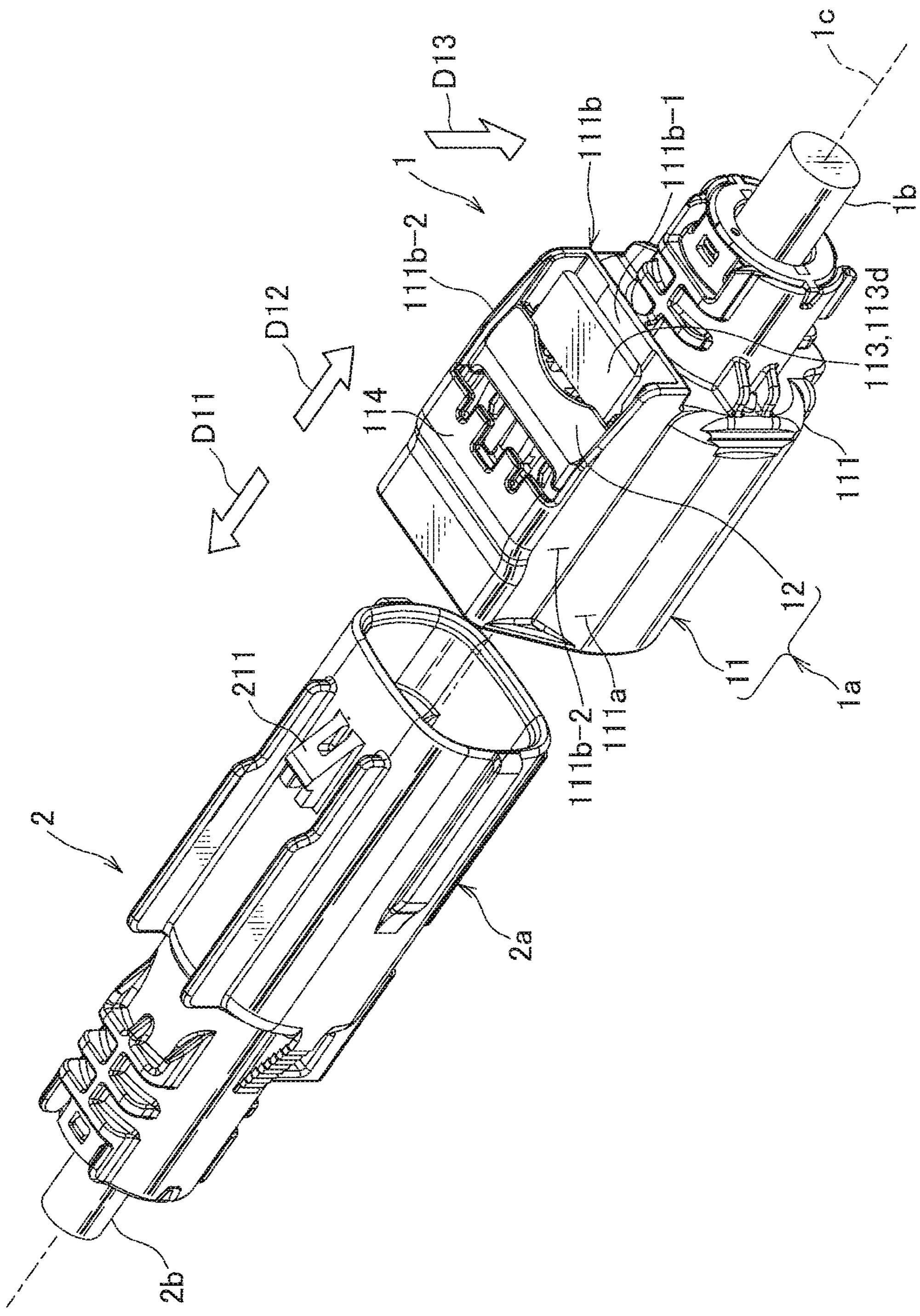
FIG. 1 is a perspective view illustrating a CPA-attached connector and a wire harness according to one embodiment in a state before mating with a mating connector.
Figure 2:
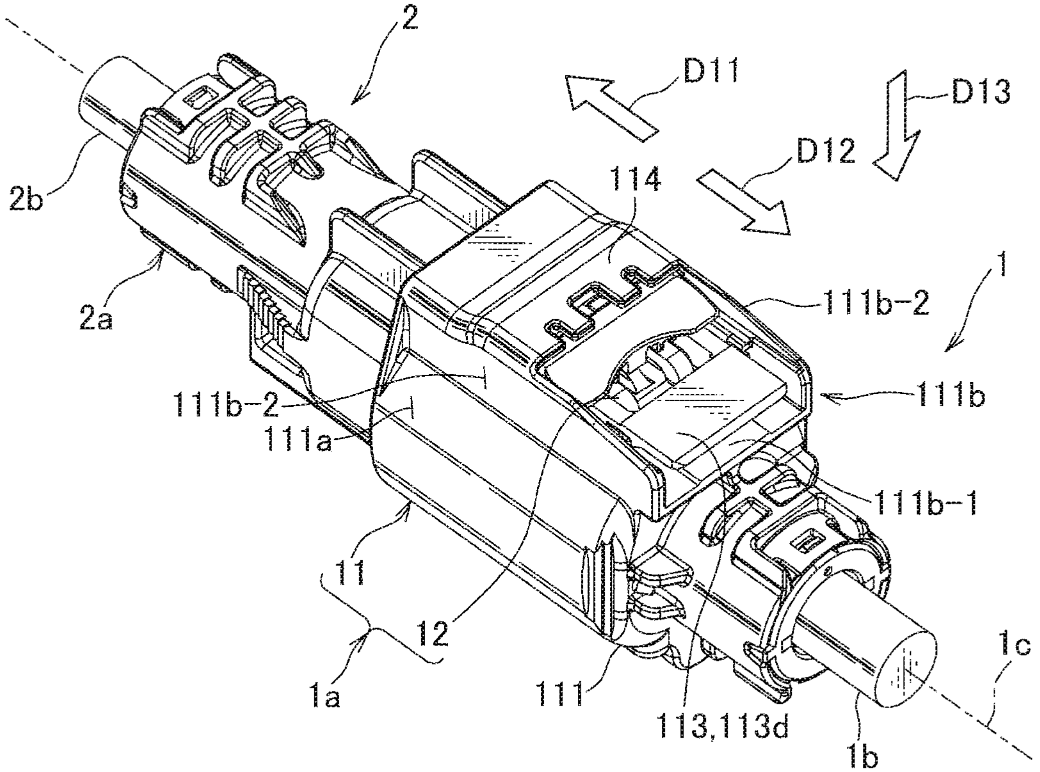
FIG. 2 is a perspective view illustrating the CPA-attached connector and the wire harness as illustrated in FIG. 1 in a mating state with the mating connector.

FIG. 1 is a perspective view illustrating a CPA-attached connector and a wire harness according to one embodiment in a state before mating with a mating connector. FIG. 2 is a perspective view illustrating the CPA-attached connector and the wire harness as illustrated in FIG. 1 in a mating state with the mating connector.

A wire harness 1 according to the present embodiment is mounted on, for example, an automobile to connect various devices, and is installed by being connected to a mating wire harness 2 in a manner of a connector. The wire harness 1 has a CPA-attached connector 1*a* and an electric wire 1*b* extending from the CPA-attached connector 1*a*. The mating wire harness 2 also has a mating connector 2*a* and an electric wire 2*b*, and the connection in a manner of a connector between the wire harness 1 and the mating wire harness 2 is performed by mating the CPA-attached connector 1*a* and the mating connector 2*a*.

Here, the CPA-attached connector 1*a* in the wire harness 1 includes a connector body 11 and a CPA member 12. The connector body 11 is made by accommodating a connector terminal, connected to the tip of the electric wire 1*b*, in a connector housing 111 made of resin including a peripheral wall 111*a* in a substantially cylindrical shape. The connector body 11 mates with the mating connector 2*a* in a mating direction D11 along a central axis 1*c* of the connector body 11.

The CPA member 12 is attached to the outer wall of the connector housing 111 in a temporary latch state. When the connector body 11 and the mating connector 2*a* mate with each other, the CPA member 12 is pushed in and slid by a finger in the mating direction D11 to fully latch to the connector housing 111. FIG. 1 illustrates the CPA member 12 in the temporary latch state, and FIG. 2 illustrates the CPA member 12 in the full latch state. The CPA member 12 assures mating between the connector body 11 and the mating connector 2*a* by transitioning from the temporary latch state to the full latch state in this manner. In addition, the CPA member 12 also has a function of prohibiting the mating cancellation of the connector body 11 from the mating connector 2*a* in addition to the above-described mating assurance during mating, although the details will be described later. During mating cancellation, the CPA member 12 is slid in a cancellation direction D12, which is opposite to the mating direction D11, before the mating cancellation, to be returned from the full latch state illustrated in FIG. 2 to the temporary latch state illustrated in FIG. 1. When the CPA member 12 returns to the temporary latch state, the prohibition of the mating cancellation is lifted to permit the mating cancellation of connector body 11 from the mating connector 2*a*.

Figure 3:
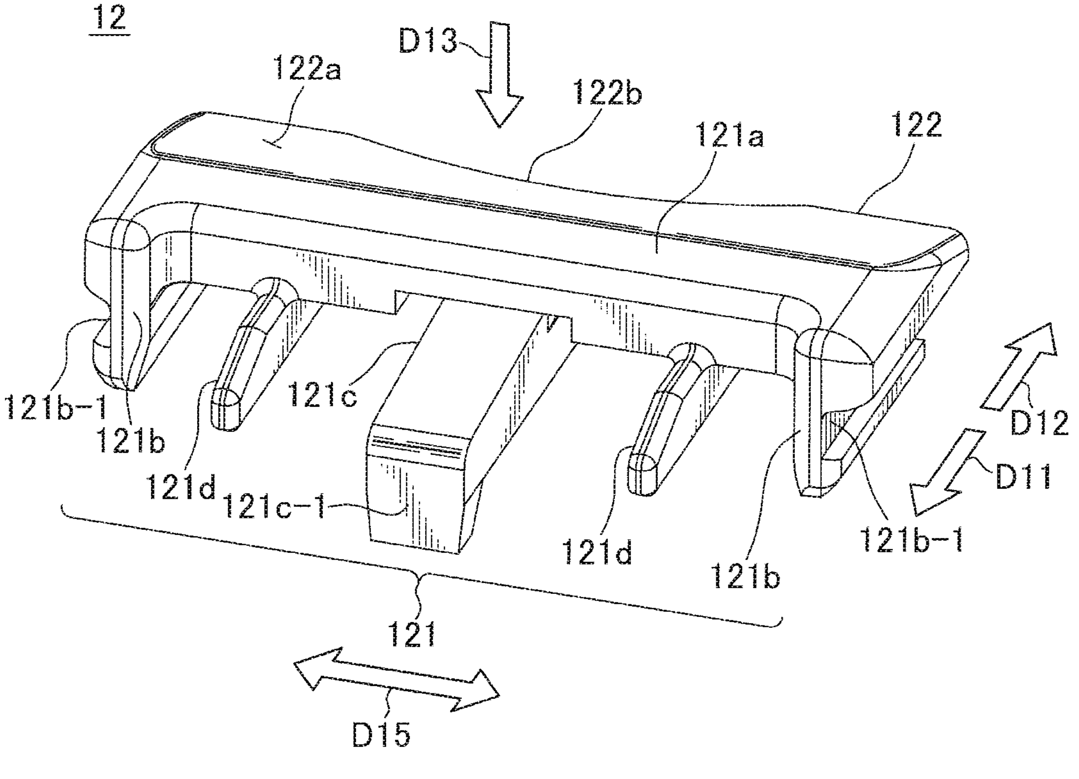
FIG. 3 is a perspective view illustrating a CPA member.
Figure 4:
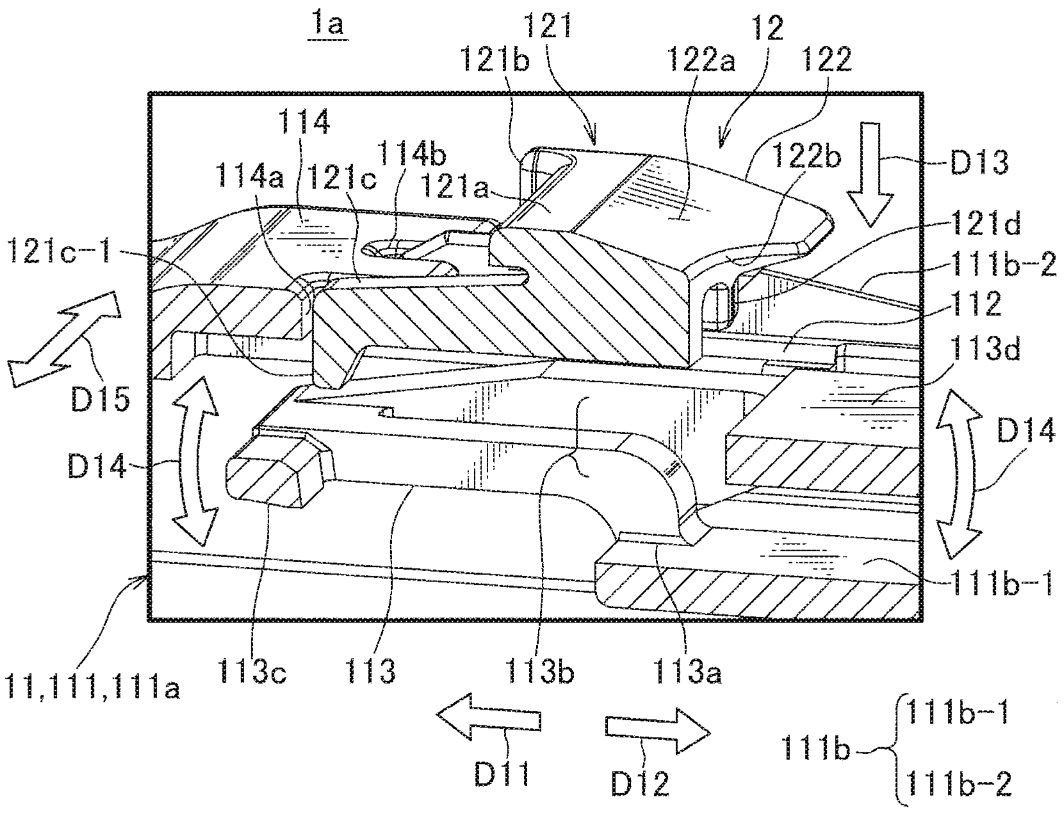
FIG. 4 is a cross-sectional view, taken along the central axis of the connector body, illustrating how the CPA member illustrated in FIG. 3 is attached to the connector body.

FIG. 3 is a perspective view illustrating a CPA member. FIG. 4 is a cross-sectional view, taken along the central axis of the connector body, illustrating how the CPA member illustrated in FIG. 3 is attached to the connector body.

The CPA member 12 includes a CPA body 121 configured to perform a temporary latch and a full latch and a finger rest portion 122 that is a finger rest during transitioning from the temporary latch state to the full latch state. This CPA member 12 is attached, from an attaching direction D13 intersecting the mating direction D11, to the peripheral wall 111*a* of the connector housing 111 of the connector body 11.

On the other hand, as illustrated in FIG. 1 and FIG. 2, the peripheral wall 111*a* of the connector housing 111 of the connector body 11 is provided with a CPA-receiving portion 111*b* for receiving the CPA member 12 in the attaching direction D13. The CPA-receiving portion 111*b* includes a bottom plate portion 111*b*-1 in a rectangular plate shape forming a portion of the peripheral wall 111*a* and a pair of side plate ribs 111*b*-2 provided vertically on a pair of side edges of the bottom plate portion 111*b*-1 along the mating direction D11. The CPA-receiving portion 111*b* includes these portions and is a portion a cross section of which taken in a plane crossing the mating direction D11 is in a substantially U shape and which is open in the attaching direction D13. In the present embodiment, inside the CPA-receiving portion 111*b*, temporary latch portions 112 and a full latch portion 113 are provided as portions related to holding of the CPA member 12. In addition, a hood portion 114 is provided to partially connect the front sides, in the mating direction D11, of the side plate ribs 111*b*-2 of the CPA-receiving portion 111*b* and partially close the CPA-receiving portion 111*b*.

The temporary latch portions 112 are portions which are provided on the peripheral wall 111*a* of the connector housing 111 and to which the CPA body 121 of the CPA member 12 is attached in the temporary latch state. The temporary latch state referred to herein is a state movable in the mating direction D11 during mating between the mating connector 2*a* and the connector body 11. In the present embodiment, the temporary latch portions 112 are guide rails provided, in a protruding manner along the mating direction D11, on the in inner wall surfaces of the respective side plate ribs 111*b*-2 of the CPA-receiving portion 111*b*. The CPA member 12 temporarily latches to the temporary latch portion 112, and the temporary latch portion 112 guides sliding of the CPA member 12 along the mating direction D11.

The full latch portion 113 is a portion which is provided on the bottom plate portion 111*b*-1 of the CPA-receiving portion 111*b* of the peripheral wall 111*a* of the connector housing 111 and to which the CPA member 12 fully latches during mating between the mating connector 2*a* and the connector body 11. Before mating, the full latch portion 113 restricts full latch by sliding of the CPA member 12, and during mating, restriction is cancelled by the mating connector 2*a*. In the present embodiment, the full latch portion 113 is a portion that extends along the central axis 1*c* (FIG. 1 and FIG. 2) of the connector housing 111 and that has an outline in a substantially rectangular shape in a top view as seen from the attaching direction D13. At a central portion in the longitudinal direction, the full latch portion 113 is connected to the bottom plate portion 111*b*-1, and the full latch portion 113 is configured to be swingable, around connection portions 113*a*, in a swing direction D14 indicated by an arrow in FIG. 4.

Furthermore, this full latch portion 113 includes: a pair of full latch arms 113*b* extending from the connection portions 113*a* to the front and rear in the mating direction D11; and a full latch bridge portion 113*c* connecting end portions on the front side, in the mating direction D11, of the full latch arms 113*b*. The CPA member 12 latches to the full latch bridge portion 113*c* in the full latch state.

Furthermore, the full latch bridge portion 113*c* of the full latch portion 113 passes over and latches to a protruding portion 211 (FIG. 1), provided on the outer wall of the mating connector 2*a*, in the mating direction D11 during mating between the mating connector 2*a* and the connector body 11. The full latch bridge portion 113*c* is a portion that is unlatched from the protruding portion 211 by passing over the protruding portion 211 in the cancellation direction D12 during mating cancellation. The full latch portion 113 is provided with an assist lever 113*d* in such a manner as to connect the end portions on the rear side, in the mating direction D11, of the full latch arms 113*b*. The assist lever 113*d* lifts the full latch bridge portion 113*c* to pass over the protruding portion 211 so as to assist passing over during the mating cancellation. As illustrated in FIG. 1 and FIG. 2, the assist lever 113*d* is exposed on the rear side, in the mating direction D11, with reference to the CPA member 12 in the temporary latch state. During the mating cancellation, the worker pushes down the assist lever 113*d* in the attaching direction D13, so that the full latch bridge portion 113*c* can be lifted to pass over the protruding portion 211 so that passing over is assisted.

As illustrated in FIG. 1 and FIG. 2, the hood portion 114 is a portion that partially connects the front sides, in the mating direction D11, of the side plate ribs 111*b*-2 of the CPA-receiving portion 111*b* and partially closes the CPA-receiving portion 111*b*. The hood portion 114 as well as the full latch bridge portion 113*c* of the full latch portion 113 cover, in a manner of a canopy, a portion of the front side, in the mating direction D11, of the CPA member 12 in the full latch state. Also, the hood portion 114 closes the CPA-receiving portion 111*b* while a receiving space capable of receiving the CPA member 12 in the attaching direction D13 is left open on the rear side in the mating direction D11.

The CPA body 121 of the CPA member 12 held by a holding structure as explained above provided inside the CPA-receiving portion 111*b* includes a cross-beam portion 121*a*, a pair of side arm portions 121*b*, an arm portion 121*c*, and a pair of cancellation prohibiting units 121*d*.

The cross-beam portion 121*a* is a portion in a beam shape extending in the width direction D15 that intersects both the mating direction D11 and the attaching direction D13.

The pair of side arm portions 121*b* is a pair of portions in a rib wall shape provided, at both end portions of the cross-beam portion 121*a*, so as to extend in both the mating direction D11 and the attaching direction D13. Furthermore, groove rails 121*b*-1 that latch to the temporary latch portions 112 are provided on the respective outer surfaces of the side arm portions 121*b*, such that the temporary latch portions 112 provided as guide rails on the inner wall surfaces of the side plate ribs 111*b*-2 of the CPA-receiving portion 111*b* fit on the inner sides of the groove rails 121*b*-1. When the CPA member 12 is pushed into the CPA-receiving portion 111*b* in the attaching direction D13, the groove rails 121*b*-1 of the side arm portions 121*b* latch to the temporary latch portions 112 of the side plate ribs 111*b*-2. A state in which the groove rails 121*b*-1 and the temporary latch portions 112 latch is the temporary latch state.

The arm portion 121*c* is a portion that extends in a cantilever manner toward the front side in the mating direction D11 from the central portion of the cross-beam portion 121*a* in the width direction D15 and that is provided with a lever-tip end portion 121*c*-1 bent in a hook shape. The arm portion 121*c* is a portion that latches to the full latch bridge portion 113*c* of the full latch portion 113 to make the CPA member 12 in the full latch state. Before the mating, when the lever-tip end portion 121*c*-1 comes into contact with the full latch bridge portion 113*c* of the full latch portion 113, the full latch is restricted, and the above-described temporary latch state is maintained. On the other hand, during the mating, the lever-tip end portion 121*c*-1 is pushed up by the mating connector 2*a* in such a manner as to allow the lever-tip end portion 121*c*-1 to pass over the full latch bridge portion 113*c*, so that restriction is cancelled. In this state, the CPA member 12 is pushed in the mating direction D11, so that the lever-tip end portion 121*c*-1 passes over and latches to the full latch bridge portion 113*c* to attain the full latch state.

The cancellation prohibiting units 121*d* are rib-shaped portions for holding, in the attaching direction D13, the full latch arms 113*b* of the full latch portion 113 in the full latch state. When the full latch arm 113*b* is held in the attaching direction D13, the full latch bridge portion 113*c* cannot move in a direction to pass over the protruding portion 211 of the mating connector 2*a* even if the assist lever 113*d* is pushed in the attaching direction D13. The pair of cancellation prohibiting units 121*d* is a portion for prohibiting the mating cancellation with respect to the mating connector 2*a* by prohibiting passing over the protruding portion 211 by immobilizing the full latch bridge portion 113*c* in the full latch state. In the present embodiment, the cancellation prohibiting units 121*d* are arranged inside the side arm portions 121*b* such that the arm portion 121*c* is interposed between the cancellation prohibiting units 121*d*. The cancellation prohibiting units 121*d* extend in a rib shape from the cross-beam portion 121*a* to the front side in the mating direction D11 such that the tips of the cancellation prohibiting units 121*d* are at a position slightly on the rear side in the mating direction D11 with respect to the lever-tip end portion 121*c*-1 of the arm portion 121*c*. Since the cancellation prohibiting units 121*d* are arranged in such a position, the cancellation prohibiting units 121*d* hold both ends, in the width direction D15, of the full latch arm 113*b* at a position slightly on the rear side in the mating direction D11 with respect to the full latch bridge portion 113*c* in the full latch state.

Furthermore, the finger rest portion 122 of the CPA member 12 is a portion that is provided integrally with the CPA body 121 on the rear side of the CPA body 121 in the mating direction D11 and that serves as a finger rest when transitioning from the temporary latch state to the full latch state as described above. On the top surface on the side of the attaching direction D13, an inclined surface 122*a* is formed such that the boundary between the inclined surface 122*a* and the CPA body 121 is the top portion of the inclined surface 122*a* and that the inclined surface 122*a* descends in the attaching direction D13 in accordance with a distance from the top portion in the cancellation direction D12. Furthermore, the finger rest portion 122 is formed with a notch recess 122*b* that is notched, at the edge of the lower inclined side opposite to the top portion, in an arcuate shape recessed toward the top portion.

In addition, in the CPA-receiving portion 111*b*, the following three recesses are formed in the edge on the rear side, in the mating direction D11, of the hood portion 114 that define the front side, in the mating direction D11, of the space for receiving the CPA member 12. Specifically, a rectangular recess 114*a* in which the arm portion 121*c* passes in the attaching direction D13 during attachment as illustrated in FIG. 4 is provided in the center, in the width direction D15, of the edge of the hood portion 114. Furthermore, a pair of slit recesses 114*b* in which the pair of cancellation prohibiting units 121*d* passes in the attaching direction D13 is provided such that the rectangular recess 114*a* is interposed between the slit recesses 114*b*.

Next, the temporary latch state and the full latch state of the CPA member 12 with respect to the connector body 11 is further explained with reference to separate drawings, although some of the explanations overlap with the explanation made so far. First, the temporary latch state is explained.

Figure 5A:
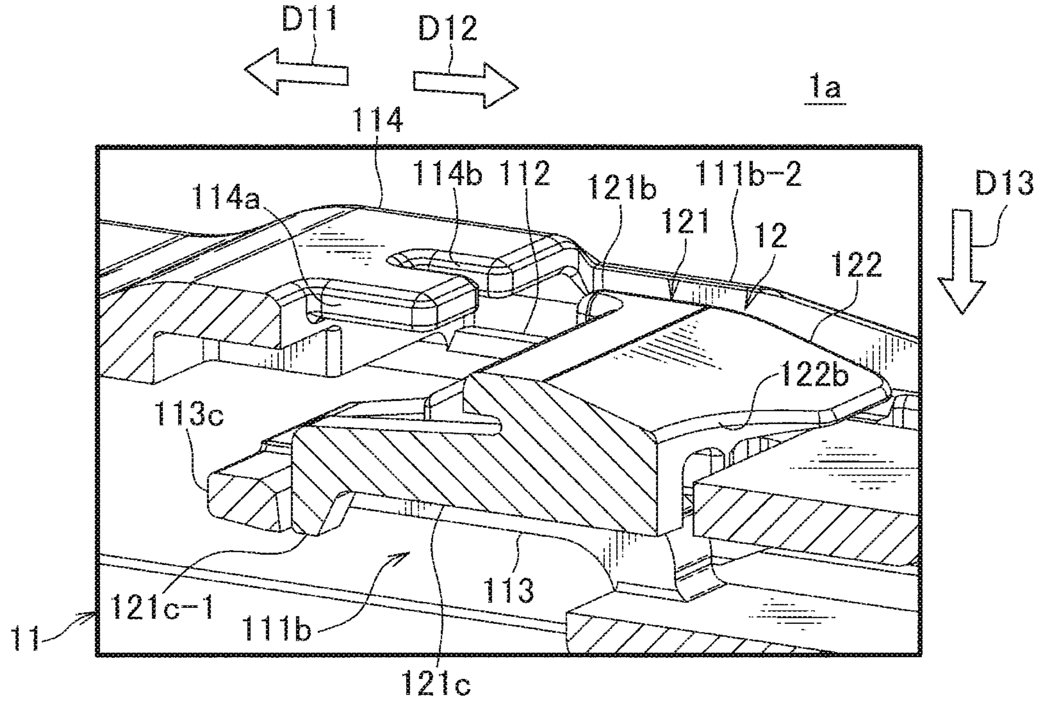
FIG. 5A is a cross-sectional view equivalent to FIG. 4.
Figure 5B:
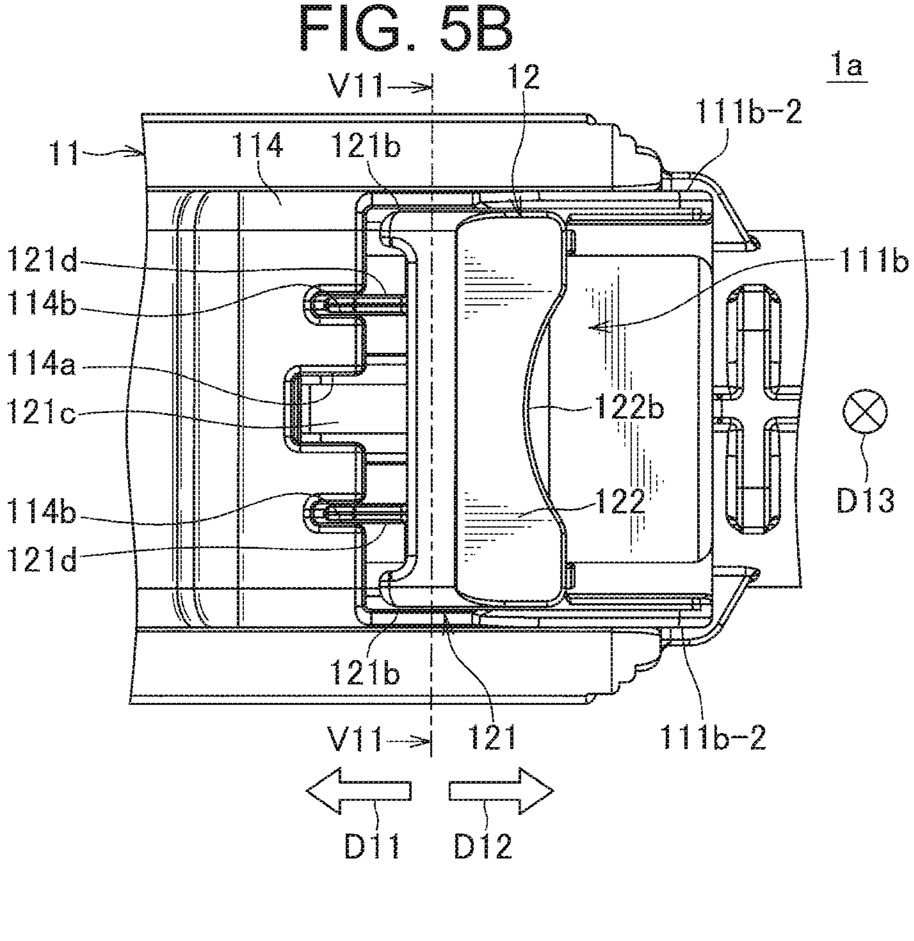
FIG. 5B is a top view, as seen from the attaching direction, illustrating a temporary latch state in which the CPA member is temporarily latched to the connector body.
Figure 6:
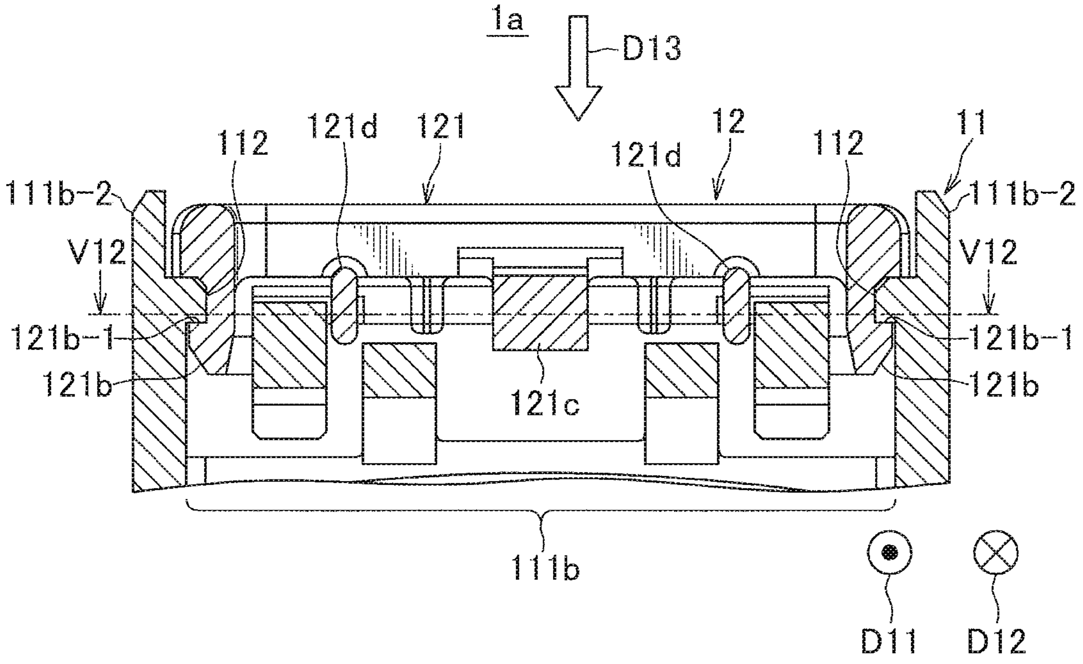
FIG. 6 is a cross-sectional view, taken along line V11-V11 of FIG. 5B, illustrating the CPA member and a CPA-receiving portion illustrated in FIGS. 5A and 5B.

FIG. 5A is a cross-sectional view equivalent to FIG. 4, and FIG. 5B is a top view, as seen from the attaching direction, illustrating a temporary latch state in which the CPA member is temporarily latched to the connector body. FIG. 5A illustrates the cross-sectional view in the temporary latch state. FIG. 5B illustrates a top view in the temporary latch state. FIG. 6 is a cross-sectional view, taken along line V11-V11 of FIG. 5B, illustrating the CPA member and a CPA-receiving portion illustrated in FIGS. 5A and 5B. FIG.

7 is a cross-sectional view, taken along line V12-V12 of FIG. 6, illustrating the CPA member and the CPA-receiving portion illustrated in FIG. 6.

Figure 7:
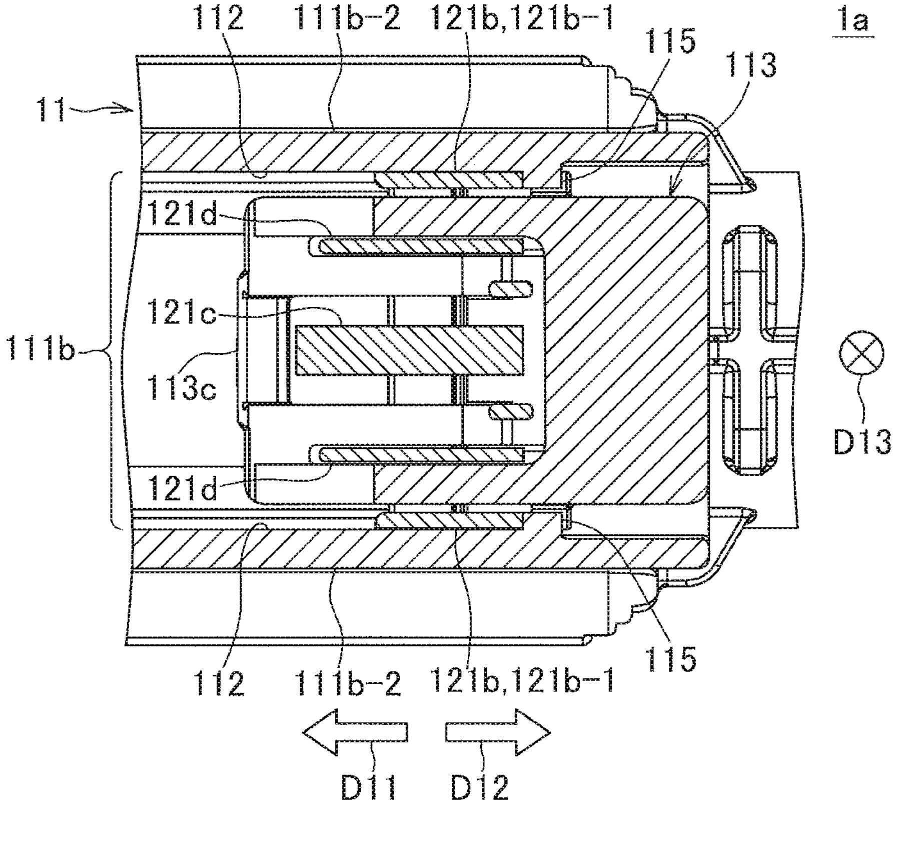
FIG. 7 is a cross-sectional view, taken along line V12-V12 of FIG. 6, illustrating the CPA member and the CPA-receiving portion illustrated in FIG. 6.

As illustrated in FIG. 6, in the temporary latch state, the temporary latch portions 112 of the side plate ribs 111*b*-2 of the CPA-receiving portion 111*b* of the connector body 11 fit in and latch to the groove rails 121*b*-1 of the side arm portions 121*b* of the CPA body 121 of the CPA member 12. As illustrated in FIGS. 5A and 5B, on the front side in the mating direction D11, the lever-tip end portion 121*c*-1 of the arm portion 121*c* is in contact with the full latch bridge portion 113*c* of the full latch portion 113 to restrict movement into the full latch. Furthermore, as illustrated in FIG. 7, on the rear side in the mating direction D11, the rear ends of the side arm portions 121*b* of the CPA body 121 are in contact with stopper protrusions 115 protruding from the side plate ribs 111*b*-2 on the rear side of the temporary latch portions 112 to restrict detachment in the cancellation direction D12.

In the present embodiment, this temporary latch state is a state in which the CPA member 12 is pushed to the CPA-receiving portion 111*b* in the attaching direction D13 as illustrated in FIG. 4, and the CPA member 12 that has been pushed latches thereto. In the mating direction D11 and the cancellation direction D12, the distance between the full latch bridge portion 113*c* and the stopper protrusion 115 is slightly longer than the length of the CPA member 12 from the lever-tip end portion 121*c*-1 to the rear end of the side arm portion 121*b*. Due to the relationship in size, in the temporary latch state, the CPA member 12 can move with certain margin in the mating direction D11 and the cancellation direction D12 in the CPA-receiving portion 111*b*. In the temporary latch state, substantially the entire CPA member 12 including the CPA body 121 and the finger rest portion 122 is exposed in the CPA-receiving portion 111*b*. In this case, the arm portion 121*c* and the pair of cancellation prohibiting units 121*d* are exposed through the rectangular recess 114*a* and the pair of slit recesses 114*b* at the edge of the hood portion 114.

In the temporary latch state as explained above, when the connector body 11 and the mating connector 2*a* mate to each other, and the CPA member 12 is pushed in the mating direction D11 with a finger placed on the notch recess 122*b* of the finger rest portion 122, the CPA member 12 transitions to the full latch state. The CPA member 12 assures mating by transitioning to the full latch state. Furthermore, in the full latch state, as the above-described, the cancellation prohibiting units 121*d* of the CPA member 12 hold both ends of the full latch bridge portion 113*c* of the full latch portion 113 to prohibit cancellation of mating between the connector body 11 and the mating connector 2*a*. Hereinafter, this full latch state is explained.

Figure 8A:
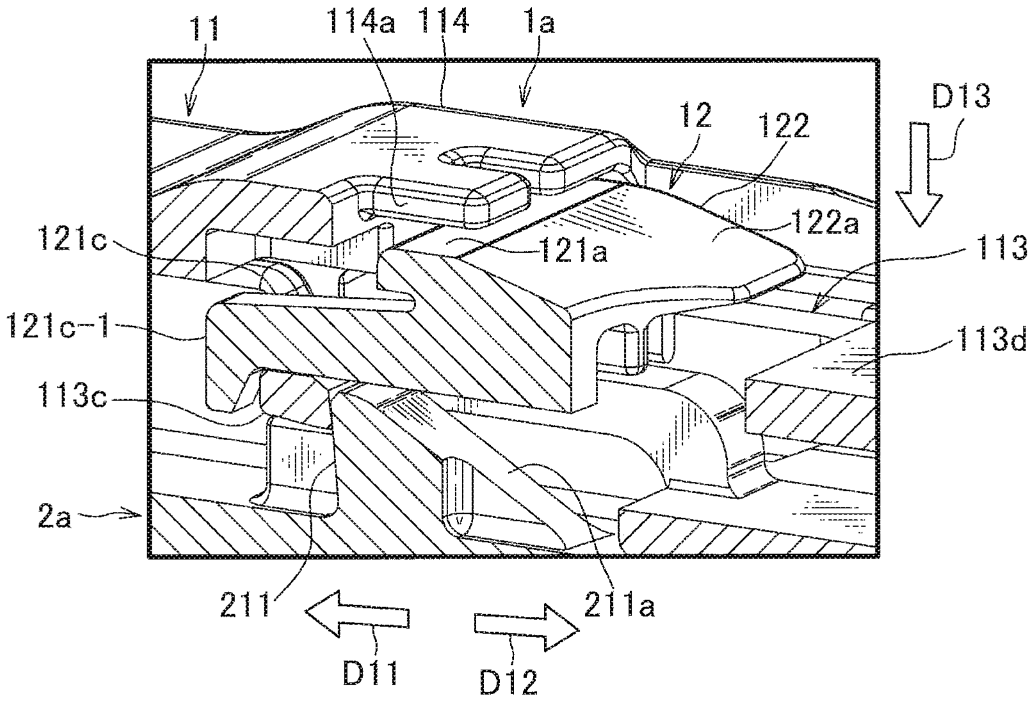
FIGS. 8A and 8B are a cross-sectional view and a top view equivalent to FIGS. 5A and 5B, respectively, illustrating a full latch state in which the CPA member is fully latched to the connector body.
Figure 8B:
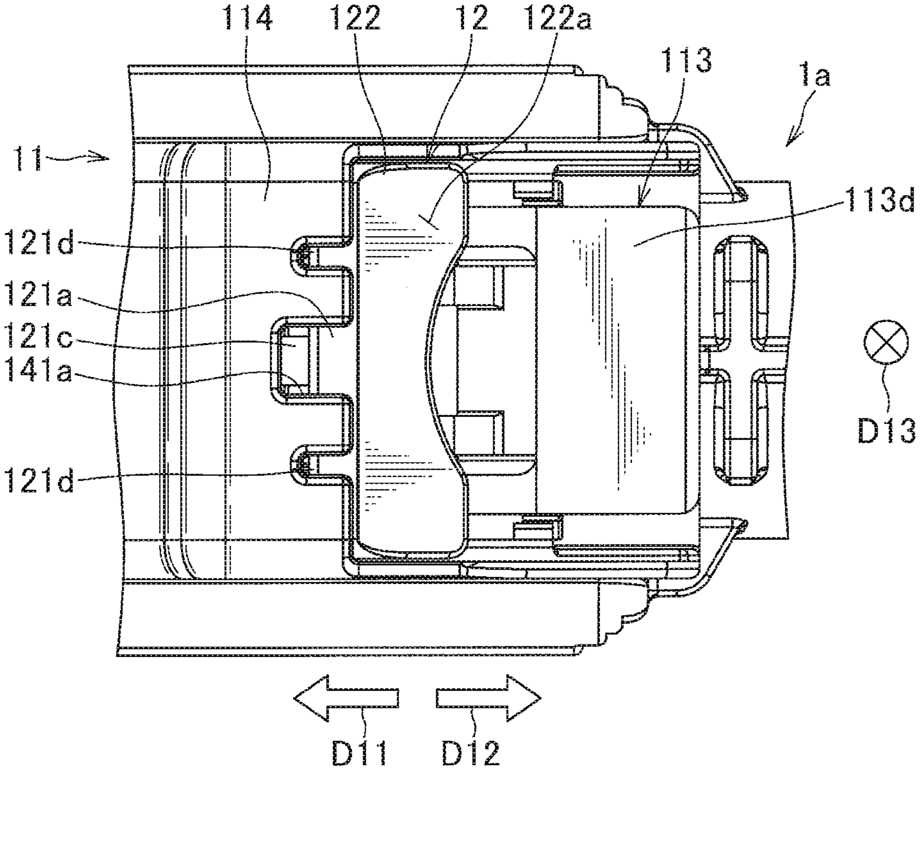
Figure 9:
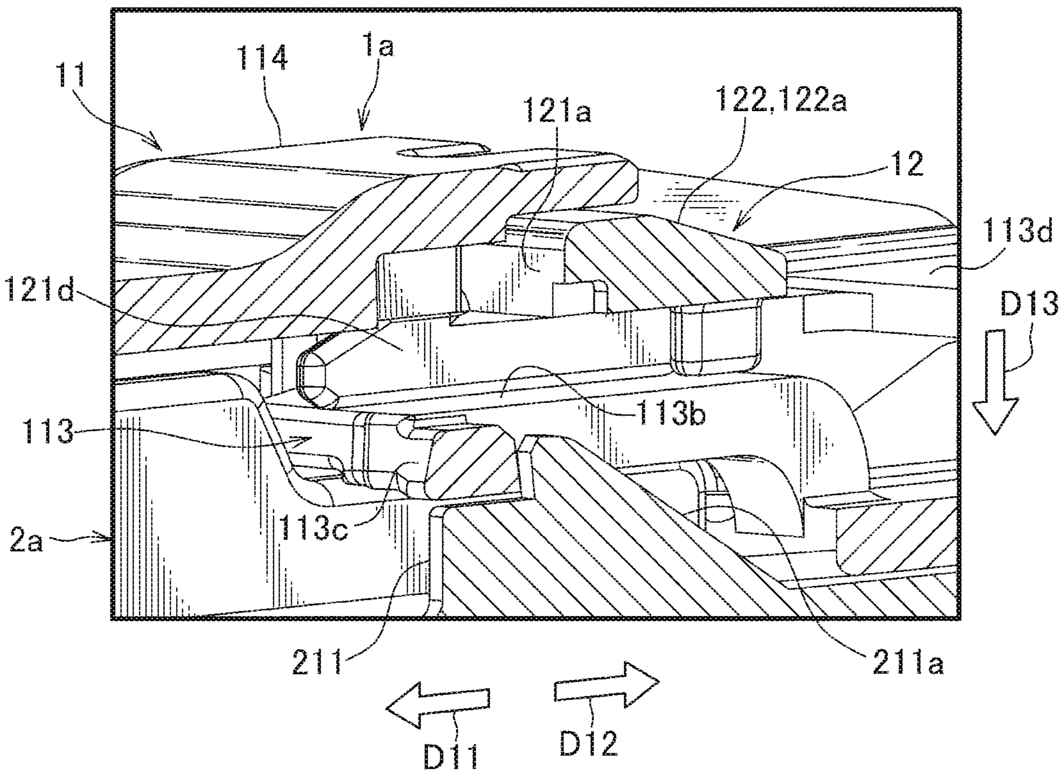
FIG. 9 is a diagram illustrating how cancellation of mating between a connector body and a mating connector is prohibited by a pair of cancellation prohibiting units of the CPA member.

FIGS. 8A and 8B are a cross-sectional view and a top view equivalent to FIGS. 5A and 5B, respectively, illustrating a full latch state in which the CPA member is fully latched to the connector body. FIG. 8A is a cross-sectional view in the full latch state, and FIG. 8B is a top view illustrating the full latch state. FIG. 9 is a diagram illustrating how cancellation of mating between the connector body and the mating connector is prohibited by the pair of cancellation prohibiting units of the CPA member.

When the connector body 11 and the mating connector 2*a* mate each other, the protruding portion 211 provided on the outer wall of the mating connector 2*a* as also illustrated in FIG. 1 enters the inner side of the hood portion 114 of the connector body 11. An inclined surface 211*a* is formed on the mating side of the protruding portion 211 for mating with the connector body 11. During mating, on the inner side of the hood portion 114, first, the full latch bridge portion 113*c* of the full latch portion 113 comes into contact with the inclined surface 211*a* and passes over and latches to the protruding portion 211 in such a manner as to be pushed up. In this case, the protruding portion 211 goes under the lever-tip end portion 121*c*-1 of the arm portion 121*c* of the CPA member 12 located on the rear side, in the mating direction D11, of the full latch bridge portion 113*c* in the temporary latch state. When the lever-tip end portion 121*c*-1 is pushed up by the protruding portion 211 to the position where the lever-tip end portion 121*c*-1 can pass over the full latch bridge portion 113*c*, the CPA member 12 can move to the front side in the mating direction D11. Specifically, the full latch, which was restricted by the contact of the lever-tip end portion 121*c*-1 to the full latch bridge portion 113*c* in the temporary latch state, is unrestricted and enabled by the mating with the mating connector 2*a*. In this restriction-cancelled state, when the CPA member 12 is pushed to the front side in the mating direction D11, the lever-tip end portion 121*c*-1 of the arm portion 121*c* moves to the front side, in the mating direction D11, of the full latch bridge portion 113*c* to make a full latch as illustrated in FIGS. 8A and 8B. In this case, the edge of the cross-beam portion 121*a* of the CPA body 121 on the front side in the mating direction D11 comes into contact with the wall surface inside the hood portion 114 to restrict further pushing. In this manner, the CPA member 12 assures mating with the mating connector 2*a* by transitioning to the full latch state in which it is fully latched to the connector body 11.

As explained below, during mating cancellation with the mating connector 2*a*, the CPA member 12 is returned back to the temporary latch state as illustrated in FIGS. 5A, 5B to FIG. 7 before the mating cancellation. In this state, when the assist lever 113*d* of the full latch portion 113 is pushed in the attaching direction D13, the full latch bridge portion 113*c* is lifted to pass over the protruding portion 211, so that mating with the mating connector 2*a* is cancelled.

In the present embodiment, in the full latch state, the entire finger rest portion 122 of the CPA member 12 is exposed from the hood portion 114 of the connector body 11. In the exposed portion of the finger rest portion 122, the inclined surface 122*a* is a surface inclined toward the central axis 1*c* (FIG. 1 and FIG. 2) of the connector body 11 in accordance with a distance from the hood portion 114. Furthermore, in the present embodiment, in the full latch state, the inclined surface 122*a* of the finger rest portion 122 is configured to start to incline, toward the central axis 1*c*, from the top portion located immediately below the edge of the hood portion 114 on the side where the finger rest portion 122 is exposed.

Also, as illustrated in FIG. 9, in the full latch state, cancellation of mating between the connector body 11 and the mating connector 2*a* is prohibited by the pair of cancellation prohibiting units 121*d* of the CPA member 12. Specifically, the pair of cancellation prohibiting units 121*d* hold, in the attaching direction D13, the pair of full latch arms 113*b* located on both sides of the full latch bridge portion 113*c* of the full latch portion 113. In this state, even when the assist lever 113*d* is pushed in the attaching direction D13, the full latch bridge portion 113*c* cannot move to a position where the full latch bridge portion 113*c* can pass over the protruding portion 211. The pair of cancellation prohibiting units 121*d* prohibits mating cancellation by prohibiting the full latch bridge portion 113*c* from passing over the protruding portion 211 in this manner. This prohibited state of mating cancellation is maintained until the CPA member 12 is returned back to the temporary latch state and the cancellation prohibiting units 121*d* are released from the full latch bridge portion 113*c*.

In this case, when the CPA member 12 is returned back from the full latch state to the temporary latch state in order to cancel this prohibited state of mating cancellation, a jig is used to pull the CPA member 12 in the cancellation direction D12. The jig may be a rod-shaped jig in a hook shape a tip of which can latch the cross-beam portion 121*a* of the CPA member 12.

In this case, in the present embodiment, the rectangular recess 114*a* for allowing the arm portion 121*c* to pass when the CPA member 12 is attached is notched and formed in the edge of the hood portion 114 on the side where the finger rest portion 122 is exposed. After the CPA member 12 is attached, the rectangular recess 114*a* serves as an opening for allowing access to the inside of the hood portion 114. This rectangular recess 114*a* is used as a jig latching-recessed portion for latching the jig for pulling the CPA member 12 to the CPA member 12. The jig is inserted from the rectangular recess 114*a* to the inside of the hood portion 114, and the tip in the hook shape is latched to the cross-beam portion 121*a* of the CPA member 12. In this state, when the jig is pulled in the cancellation direction D12, the lever-tip end portion 121*c*-1 passes over the full latch bridge portion 113*c* to be detached in such a manner that the inclined surface formed on the inside of the lever-tip end portion 121*c*-1 of the arm portion 121*c* slides on the full latch bridge portion 113*c*. Subsequently, the CPA member 12 is pulled in the cancellation direction D12, so that the CPA member 12 is returned back to the temporary latch state as illustrated in FIGS. 5A, 5B to FIG. 7.

According to the CPA-attached connector 1*a* and the wire harness 1 of the embodiment explained above, the inclined surface 122*a* is formed in the exposed portion of the finger rest portion 122 of the CPA member 12 that is exposed from the hood portion 114 in the full latch state. This inclined surface 122*a* makes it more difficult for a finger to grip the finger rest portion 122 even if the CPA member 12 in the full latch state is touched with a hand, and the inclined surface 122*a* can alleviate unintentional reversion of the CPA member 12 from the full latch state to the temporary latch state.

In this case, in the present embodiment, the inclined surface 122*a* of the finger rest portion 122 starts to incline, toward the central axis 1*c* of the connector body 11, from the top portion located immediately below the edge of the hood portion 114 in the full latch state. According to this configuration, the ratio of the inclined surface 122*a* to the exposed portion of the finger rest portion 122 in the full latch state is high, which makes it even more difficult for a finger to grip the finger rest portion 122, so that unintentional reversion of the CPA member 12 can be further alleviated.

Furthermore, in the present embodiment, the finger rest portion 122 is formed with the notch recess 122*b* on the edge opposite to the hood portion 114. According to this configuration, the size of area in which a finger can come into contact with the exposed portion of the finger rest portion 122 in the full latch state is reduced due to the notch recess 122*b*, which makes it more difficult for a finger to grip the finger rest portion 122, and therefore, unintentional reversion of the CPA member 12 can be further alleviated. When the CPA member 12 is pushed into the full latch state, this notch recess 122*b* serves as a point of reference for putting a finger on the finger rest portion 122. For this reason, while the contactable area is reduced as described above to make it difficult for a finger to grip it intendedly, the CPA member 12 can be caused to transition from the temporary latch state to the full latch state with high operability using the notch recess 122*b* as a point of reference.

Furthermore, in the present embodiment, the CPA body 121 is provided with the arm portion 121*c* in the cantilever shape, and before mating with the mating connector 2*a*, the lever-tip end portion 121*c*-1 comes into contact with the full latch bridge portion 113*c* of the full latch portion 113 to restrict the full latch. During the mating, the lever-tip end portion 121*c*-1 is pushed up by the mating connector 2*a* in such a manner as to allow the lever-tip end portion 121*c*-1 to pass over the full latch bridge portion 113*c*, so that restriction is cancelled. Then, the lever-tip end portion 121*c*-1 passes over the full latch portion 113 to make a full latch, so that the CPA member 12 transitions to the full latch state. According to this configuration, the arm portion 121*c* in the cantilever shape of the CPA body 121 can be bent easily, and therefore, transition of the CPA member 12 into the full latch state can be performed smoothly while reducing resistance.

Furthermore, in the present embodiment, during mating, the full latch bridge portion 113*c* of the full latch portion 113 of the connector body 11 passes over and latches to the protruding portion 211 of the mating connector 2*a*. During mating cancellation, the full latch bridge portion 113*c* passes over the protruding portion 211 to be detached from the protruding portion 211. In addition, the CPA body 121 is provided with the cancellation prohibiting units 121*d* for prohibiting mating cancellation by holding the full latch portion 113 in a direction to prohibit the full latch bridge portion 113*c* from passing over the protruding portion 211 in the full latch state. According to this configuration, holding of the full latch portion 113 by the cancellation prohibiting units 121*d* can effectively prevent unintended cancellation of mating with the mating connector when the CPA member 12 is in the full latch state.

Furthermore, in the present embodiment, the CPA member 12 is configured such that the CPA body 121 is pulled in the cancellation direction D12 and returned back to the temporary latch state. The rectangular recess 114*a* (jig latching-recessed portion) that can be used to cause the jig for pulling the CPA member 12 in the cancellation direction D12 to latch to the CPA member 12 is formed in the edge of the hood portion 114 of the connector body 11. According to this configuration, for mating cancellation, via the rectangular recess 114*a* (jig latching-recessed portion) provided in the hood portion 114, the jig can latch to the CPA member 12 with high operability, so that the CPA member 12 returns back to the temporary latch state.

The embodiment explained above merely shows typical forms of the CPA-attached connector and the wire harness. The CPA-attached connector and the wire harness are not limited thereto and can be modified and carried out in various manners.

For example, in the above-described embodiment, as an example of the CPA-attached connector and the wire harness, the CPA-attached connector 1*a* and the wire harness 1 for connecting various devices mounted on an automobile and the like are shown. However, the CPA-attached connector and the wire harness are not limited thereto, and a specific object on which they are mounted is not particularly limited.

Furthermore, in the above-described embodiment, as an example of the mating connector of the CPA-attached connector and the wire harness, the mating connector 2*a* provided on the end portion of the mating wire harness 2 is shown. However, the mating connector is not limited thereto, and may be, for example, a device connector and the like provided on the housing of a device.

Furthermore, in the above-described embodiment, as an example of the CPA-attached connector, the CPA-attached connector 1*a* in which the connector terminal is accommodated in the connector housing 111 having the peripheral wall 111*a* in the substantially cylindrical shape is shown. However, the CPA-attached connector is not limited thereto, and the shape of the housing and the like may be any tubular shape.

Furthermore, in the above-described embodiment, as an example of the CPA-attached connector, the CPA-attached connector 1*a* in which the CPA member 12 is attached, from the attaching direction D13 crossing the mating direction D11, to the peripheral wall 111*a* of the connector housing 111 is shown. However, the CPA-attached connector is not limited thereto, and the CPA member may be attached from an attaching direction along the mating direction for mating with the mating connector.

Furthermore, in the above-described embodiment, as an example of the inclined surface of the finger rest portion, the inclined surface 122*a* that starts to incline from the top portion located immediately below the edge of the hood portion 114 in the full latch state is shown. However, the inclined surface of the finger rest portion is not limited thereto, and the inclined surface 122*a* may start to incline from a top portion that is at any given position of the exposed portion of the finger rest portion that is exposed from the hood portion. However, when the inclined surface 122*a* is configured to start to incline from the top portion located immediately below the edge of the hood portion 114, the ratio of the inclined surface 122*a* to the exposed portion in the full latch state is increased, so that unintentional reversion of the CPA member 12 can be further alleviated, as described above. It should be noted that the position of the top portion of the inclined surface of the finger rest portion may be on the inner side of the hood portion that is inner than the edge of the hood portion, and even in this case, similar to the case of the top portion being immediately under the edge, unintentional reversion of the CPA member 12 can be further alleviated.

Furthermore, in the above-described embodiment, as an example of the finger rest portion, the finger rest portion 122 formed with the notch recess 122*b* at the edge is shown. However, the finger rest portion is not limited thereto, and may have a straight edge without any recessed portion. However, when the notch recess 122*b* is provided at the edge of the finger rest portion 122, unintentional reversion of the CPA member 12 can be further alleviated, and the CPA member 12 can be caused to transition to the full latch state with high operability, as described above.

Furthermore, in the above-described embodiment, as an example of the CPA body, the CPA body 121 of which the lever-tip end portion 121*c*-1 of the arm portion 121*c* in the cantilever shape fully latches to the full latch bridge portion 113*c* of the full latch portion 113 in the full latch state is shown. However, the CPA body is not limited thereto, and a specific form of latching of the connector body with the full latch portion is not particularly limited. However, according to the form of latching using the arm portion 121*c* in the cantilever shape, the CPA member 12 can transition to the full latch state smoothly alleviating resistance, as described above.

Furthermore, in the above-described embodiment, as an example of the CPA-attached connector, the CPA-attached connector 1*a* of which the full latch bridge portion 113*c* of the full latch portion 113 passes the protruding portion 211 of the mating connector 2*a* to make a latch is shown. In this CPA-attached connector 1*a*, the full latch bridge portion 113*c* passes over the protruding portion 211 to be detached therefrom during mating cancellation. In addition, the CPA body 121 is provided with the cancellation prohibiting unit 121*d* for prohibiting mating cancellation by holding the full latch portion 113 in the full latch state. However, the form of mating with the mating connector may be those other than the form with latching of the full latch portion to the protruding portion, and the form of prohibiting of mating cancellation at that occasion may be those other than the form provided with the cancellation prohibiting unit for holding the full latch portion. However, the form of prohibiting by holding the full latch portion 113 with the cancellation prohibiting unit 121*d* can effectively prevent unintended cancellation of mating with the mating connector when the CPA member 12 is in the full latch state, as described above.

Furthermore, in the above-described embodiment, as an example of the CPA-attached connector, the CPA-attached connector 1*a* in which the rectangular recess 114*a* (jig latching-recessed portion) for the jig for pulling the CPA member 12 is formed at the edge of the hood portion 114 is shown. However, the CPA-attached connector is not limited thereto, and any recessed portion may not be formed in the edge of the hood portion 114, or any jig may not be used for returning to the temporary latch state. However, when the rectangular recess 114*a* (jig latching-recessed portion) is provided in the edge of the hood portion 114, the jig can be caused to latch to the CPA member 12 so that the CPA member 12 returns to the temporary latch state with high operability, as described above.

LIST OF REFERENCE SIGNS

- 1 wire harness
- 1*a* CPA-attached connector
- 1*b*, 2*b* electric wire
- 1*c* central axis
- 2 mating wire harness
- 2*a* mating connector
- 11 connector body
- 12 CPA member
- 111 connector housing
- 111*a* peripheral wall
- 111*b* CPA-receiving portion
- 111*b*-1 bottom plate portion
- 111*b*-2 side plate rib
- 112 temporary latch portion
- 113 full latch portion
- 113*a* connection portion
- 113*b* full latch arm
- 113*c* full latch bridge portion
- 113*d* assist lever
- 114 hood portion
- 114*a* rectangular recess (jig latching-recessed portion)
- 114*b* slit recess
- 121 CPA body
- 121*a* cross-beam portion
- 121*b* side arm portion
- 121*b*-1 groove rail
- 121*c* arm portion
- 121*c*-1 lever-tip end portion
- 121*d* cancellation prohibiting unit
- 122 finger rest portion
- 122*a* inclined surface
- 122*b* notch recess

211 protruding portion
211*a* inclined surface
D11 mating direction
D12 cancellation direction
D13 attaching direction
D14 swing direction
D15 width direction

What is claimed is:

1. A CPA-attached connector comprising:

a connector body including a peripheral wall in a tubular shape and configured to mate with a mating connector; and a CPA member attached to the connector body in a temporary latch state, and configured to, during mating between the connector body and the mating connector, assure the mating by making a full latch and prohibit mating cancellation, and configured to, before the mating cancellation, return to the temporary latch state to permit the mating cancellation, wherein the connector body includes:

a temporary latch portion which is provided on the peripheral wall and to which the CPA member is attached in the temporary latch state;

a full latch portion provided on the peripheral wall, the full latch portion being a portion to which, during the mating, the CPA member makes the full latch, and which, before the mating, restricts the full latch of the CPA member, and which, during the mating, cancels restriction of the full latch by the mating connector; and a hood portion provided on the peripheral wall to cover, in a manner of a canopy, a portion of the CPA member in a full latch state, and wherein the CPA member includes:

a CPA body configured to make the temporary latch to the temporary latch portion and make the full latch to the full latch portion; and a finger rest portion which is a portion provided on the CPA body so as to be exposed from the hood portion in the temporary latch state and serving as a finger rest during transition to the full latch state, a portion of the finger rest portion being exposed from the hood portion even in the full latch state, an inclined surface being formed in the exposed portion to incline toward a central axis of the connector body in accordance with a distance from the hood portion.

2. The CPA-attached connector according to claim 1, wherein in the full latch state, the inclined surface of the finger rest portion starts to incline, toward the central axis, from a top portion located immediately below an edge of the hood portion on a side where the finger rest portion is exposed or located on an inner side of the hood portion that is inner than the edge of the hood portion.

3. The CPA-attached connector according to claim 1, wherein a notch recess that is notched in a shape recessed toward the hood portion is formed in an edge, on a side opposite to the hood portion, of the finger rest portion.

4. The CPA-attached connector according to claim 1, wherein the CPA body is provided with an arm portion extending in a cantilever shape in a mating direction for mating between the connector body and the mating connector, the arm portion being configured such that, before the mating, a lever-tip end portion of the arm portion comes into contact with the full latch portion to restrict the full latch, and during the mating, the lever-tip end portion is pushed up by the mating connector in such a manner as to allow the lever-tip end portion to pass over the full latch portion, so that restriction is cancelled, and the lever-tip end portion passes over and fully latches to the full latch portion.

5. The CPA-attached connector according to claim 1, wherein during the mating, the full latch portion of the connector body passes over and latches to a protruding portion provided on an outer wall of the mating connector, and during the mating cancellation, the full latch portion passes over the protruding portion to be detached from the protruding portion, and the CPA body is provided with a cancellation prohibiting unit for prohibiting the mating cancellation by holding the full latch portion in a direction to prohibit passing over the protruding portion in the full latch state.

6. The CPA-attached connector according to claim 1, wherein the CPA member is returned to the temporary latch state when the CPA body is pulled in a cancellation direction opposite to a mating direction, and a jig latching-recessed portion that is notched in a recessed shape to allow a jig for pulling the CPA member in the cancellation direction to latch to the CPA member is formed on an edge of the hood portion of the connector body on a side where the finger rest portion is exposed.

7. A wire harness comprising:

the CPA-attached connector according to claim 1; and an electric wire extending from the connector body.

8. A wire harness comprising:

the CPA-attached connector according to claim 2; and an electric wire extending from the connector body.

9. A wire harness comprising:

the CPA-attached connector according to claim 3; and an electric wire extending from the connector body.

10. A wire harness comprising:

the CPA-attached connector according to claim 4; and an electric wire extending from the connector body.

11. A wire harness comprising:

the CPA-attached connector according to claim 5; and an electric wire extending from the connector body.

12. A wire harness comprising:

the CPA-attached connector according to claim 6; and an electric wire extending from the connector body.

* * * * *